United States Patent
Nakagawa et al.

(10) Patent No.: US 12,011,862 B2
(45) Date of Patent: Jun. 18, 2024

(54) DIE AND METHOD FOR MOLDING REINFORCING BAR

(71) Applicant: NAKAGAWA SANGYO Co., Ltd., Inuyama (JP)

(72) Inventors: Hiroshige Nakagawa, Inuyama (JP); Noriaki Nakagawa, Inuyama (JP)

(73) Assignee: NAKAGAWA SANGYO CO., LTD., Inuyama (JP)

( * ) Notice: Subject to any disclaimer, the term of this patent is extended or adjusted under 35 U.S.C. 154(b) by 90 days.

(21) Appl. No.: 17/530,519

(22) Filed: Nov. 19, 2021

(65) Prior Publication Data

US 2022/0161479 A1    May 26, 2022

(30) Foreign Application Priority Data

Nov. 20, 2020    (JP) ................. 2020-192874

(51) Int. Cl.
| | | |
|---|---|---|
| *B29C 48/30* | (2019.01) | |
| *B29C 48/00* | (2019.01) | |
| *B29C 48/06* | (2019.01) | |
| *B29C 48/21* | (2019.01) | |
| *B29K 101/12* | (2006.01) | |

(Continued)

(52) U.S. Cl.
CPC .......... *B29C 48/304* (2019.02); *B29C 48/022* (2019.02); *B29C 48/06* (2019.02); *B29C 48/21* (2019.02); *B29K 2101/12* (2013.01); *B29K 2105/08* (2013.01); *B29L 2031/06* (2013.01)

(58) Field of Classification Search
None
See application file for complete search history.

(56) References Cited

U.S. PATENT DOCUMENTS 4,569,471 A    2/1986   Ingemansson et al.
4,770,832 A    9/1988   Okamoto et al.
(Continued)

FOREIGN PATENT DOCUMENTS

EP    0170499 A2    2/1986
EP    0303499 A1    2/1989
(Continued)

OTHER PUBLICATIONS

Office Action mailed Feb. 28, 2023, in related U.S. Appl. No. 17/645,651, including examined claims 1-20.
(Continued)

*Primary Examiner* — Robert J Grun
(74) *Attorney, Agent, or Firm* — J-TEK LAW PLLC; Jeffrey D. Tekanic; Scott T. Wakeman (57) ABSTRACT

A die for molding a reinforcing bar, which enables the production of a reinforcing bar having sufficient strength in a convenient and inexpensive manner, includes: a main flow channel (F1), formed in a central portion of a main body, that receives a molten thermoplastic polymer material (Rt) output from an extruder (2); at least one first sub flow channel (F2), formed in an outer peripheral portion of the main body, that receives the molten thermoplastic polymer material (Rt) and fluidly connects with an outer peripheral portion in the main flow channel (F1); and at least one second sub flow channel (F3) configured to receive reinforcing fibers (4) and fluidly connected with the main flow channel F1 upstream of a junction position of the main flow channel F1 and the at least one first sub flow channel (F2).

20 Claims, 5 Drawing Sheets

(51) Int. Cl.
*B29K 105/08* (2006.01)
*B29L 31/06* (2006.01)

(56) References Cited

U.S. PATENT DOCUMENTS

| | | | |
|---|---|---|---|
| 5,206,085 | A | 4/1993 | Nakagawa et al. |
| 5,268,050 | A | 12/1993 | Azari |
| 5,540,797 | A | 7/1996 | Wilson |
| 5,879,602 | A | 3/1999 | Scheuring |
| 5,989,376 | A | 11/1999 | Kusy et al. |
| 6,007,655 | A | 12/1999 | Gorthala et al. |
| 6,270,851 | B1 | 8/2001 | Lee et al. |
| 2015/0284886 | A1 | 10/2015 | Ohtani et al. |
| 2022/0072814 | A1 | 3/2022 | Nakagawa et al. |
| 2022/0203634 | A1 | 6/2022 | Nakagawa et al. |
| 2022/0234254 | A1 | 7/2022 | Nakagawa et al. |
| 2022/0282649 | A1 | 9/2022 | Nakagawa et al. |

FOREIGN PATENT DOCUMENTS

| | | |
|---|---|---|
| JP | S53159115 U | 12/1978 |
| JP | S58132514 A | 8/1983 |
| JP | S6135232 A | 2/1986 |
| JP | S6445832 A | 2/1989 |
| JP | H0480451 A | 3/1992 |
| JP | H04278311 A | 10/1992 |
| JP | H07252372 A | 10/1995 |
| JP | 2000254978 A | 9/2000 |
| JP | 2002054270 A | 2/2002 |
| JP | 2008266648 A | 11/2008 |
| JP | 2009090474 A | 4/2009 |
| JP | 2011167804 A | 9/2011 |
| JP | 2012251378 A | 12/2012 |
| JP | 2018030318 A | 3/2018 |
| JP | 2018123180 A | 8/2018 |
| JP | 2020111989 A | 7/2020 |
| WO | 2014061384 A1 | 4/2014 |
| WO | 2017043654 A1 | 3/2017 |
| WO | 2020060506 A1 | 3/2020 |

OTHER PUBLICATIONS

Office Action from the Japanese Patent Office dispatched Jan. 18, 2022 in related Japanese application No. 2021-205638, and translation thereof.

Office Action from the Japanese Patent Office drafted on Dec. 2, 2021, in related JP application No. 2021-187527, and machine translation thereof.

Office Action from the Japanese Patent Office drafted on Jan. 12, 2022, in related JP application No. 2021-187527, and machine translation thereof.

Office Action from the Japanese Patent Office drafted on Jan. 28, 2022, in related JP application No. 2021-206703, and machine translation thereof.

Office Action from the Japanese Patent Office drafted on May 25, 2022, in related JP application No. 2021-206703, and machine translation thereof.

Office Action from the Japanese Patent Office drafted on Nov. 1, 2021, in related JP application No. 2021-142043, and machine translation thereof.

Unpublished U.S. Appl. No. 17/464,996.

DIE AND METHOD FOR MOLDING REINFORCING BAR

CROSS-REFERENCE TO RELATED APPLICATION

The present application claims priority to Japanese patent application No. 2020-192874 filed on Nov. 20, 2020, the contents of which are hereby fully incorporated herein by reference.

BACKGROUND OF THE INVENTION

Technical Field

The present invention generally relates to a die for molding a reinforcing bar ("rebar") and to a method for producing a reinforcing bar using the same, whereby a reinforcing bar can be produced that may be suitably used in the reinforcement of concrete and the like.

Related Art

Basalt fiber has been used in such a reinforcing bar ("rebar"), because basalt fiber does not rust and it enables the tensile strength of concrete to be maintained for an extended period of time. Therefore, such reinforcing bars have been gaining attention as a replacement for conventional reinforcing bars made of iron. As disclosed in Japanese Patent Laid-Open Publication No. 2012-251378, for example, a reinforcing bar having a structure obtained by covering the circumference of a core material, which is a bundle of basalt fibers, with a thermoplastic polymer (resin) layer having a predetermined thickness has been proposed. As a conventional method for forming the polymer (resin) layer around the core material, a dipping (immersion) method has been widely used in which the core material is immersed in a molten polymer (resin solution), such as is disclosed in the above-noted Japanese Patent Laid-Open Publication No. 2012-251378.

SUMMARY

However, the above-described dipping method necessitates a large scale manufacturing apparatus and relatively high production costs, because it is necessary to provide a storage tank for the molten resin (polymer) and other large equipment.

It is therefore one, non-limiting object of the present teachings to disclose techniques for improving the production of a reinforcing bar made of a fiber reinforced polymer, including without limitation providing an improved die for molding the reinforcing bar and an improved method for producing a reinforcing bar using the same that, e.g., enable the production of a reinforcing bar having sufficient strength in a relatively convenient and inexpensive manner.

In a first non-limiting aspect of the present teachings, a die (1) for molding a reinforcing bar may include: a main flow channel (F1), formed in a central portion of a die main body, that serves as a conduit (passageway) for a (molten) thermoplastic polymer (resin) material (Rt) output from an extruder (2); at least one first sub flow channel (F2), formed in an outer peripheral portion of the main body (i.e. radially outward of the main flow channel (F1)), that serves as a conduit (passageway) for the thermoplastic polymer (resin) material (Rt) to join an outer peripheral portion of the thermoplastic polymer (resin) material that is flowing in the main flow channel (F1); and at least one second sub flow channel (F3) that serves as a conduit (passageway) for one or more reinforcing fibers (4) to join (fluidly connect to) the main flow channel (F1) at a position upstream of a junction position of the main flow channel (F1) and the at least one first sub flow channel (F2).

According to the above-described first aspect, a reinforcing bar having sufficient strength can be obtained in a relatively convenient and inexpensive manner owing to the use of the above-described extruder and the die for molding, in which reinforcing fiber(s) impregnated (infiltrated) with the thermoplastic polymer (resin) material are positioned in (at) a central portion of the reinforcing bar and a predetermined thickness of the thermoplastic polymer (resin) material covers the outer periphery (or circumference) of the central portion.

In a die (1) for molding a reinforcing bar according to a second aspect of the present teachings, a plurality of types of columnar dies (11 to 14) are coupled from an upstream side to a downstream side; and the main flow channel (F1), the at least one first sub flow channel (F2), and the at least one second sub flow channel (F3) are formed (defined) as passageways (conduits) within one or more of the dies (11 to 14).

According to the above-described second aspect, the die for molding a reinforcing bar can be easily produced by first individually (separately) producing (forming) the plurality of types of columnar dies and then coupling (fastening) them together.

In a die (1) for molding a reinforcing bar according to a third aspect of the present teachings, at least a downstream portion of the at least one first sub flow channel (F2) is configured as an entire-circumference (conical) channel having a ring-shaped (endless) transverse cross section, wherein the diameter and the thickness of the entire-circumference (conical) channel decrease (taper) toward the downstream side.

According to the above-described third aspect, the outer periphery (or circumference) of the reinforcing fibers impregnated with the thermoplastic polymer (resin) material positioned in the central portion can be evenly covered with a predetermined thickness of the thermoplastic polymer (resin) material.

In a die (1) for molding a reinforcing bar according to a fourth aspect of the present teachings, the at least one second sub flow channel (F3) is formed to be curved in a direction approaching the main flow channel (F1).

According to the above-described fourth aspect, the reinforcing fibers can be suitably infiltrated (impregnated) with the thermoplastic polymer (resin) material.

In a die (1) for molding a reinforcing bar according to a fifth aspect of the present teachings, multiple second sub flow channels (F3) are formed (defined) in (along, around) a plurality of positions in a circumferential direction within the main body.

According to the above-described fifth aspect of the present invention, by forming the second sub flow channels in (along, around) a plurality of positions in the circumferential direction within the main body, a plurality of sets (bundles) of reinforcing fibers (e.g., twisted fibers) can be supplied into the main flow channel in small portions at a plurality of locations, whereby the thermoplastic polymer (resin) material can thoroughly and effectively infiltrate between the respective reinforcing fibers in an advantageous manner. It is noted that, in such an embodiment, the second sub flow channels may be formed at two to four positions in (around, along) the circumferential (peripheral) direction of the die for molding in order to minimize the complexity of the die.

In a method of producing a reinforcing bar according to a sixth aspect of the present teachings that uses the die for molding a reinforcing bar according to any of the preceding aspects, the reinforcing fiber material (4) is subjected to a fiber loosening (or fiber separating) process before introduction into the die.

According to the above-described sixth aspect, the thermoplastic polymer (resin) material can more thoroughly and effectively infiltrate between the reinforcing fibers, because additional spaces, gaps, etc. between the reinforcing fibers have been created prior to the time when the thermoplastic polymer (resin) material is caused to infiltrate (impregnate) the reinforcing fibers.

The above numerals in parentheses indicate, for reference and explanatory purposes only, representative, non-limiting correspondence relationships with specific structures described in the below-described embodiment of the present teachings. Such reference numbers are not intended to restrict or limit the scope of the present teachings in any manner.

As described in the foregoing, a die for molding a reinforcing bar and a method of producing a reinforcing bar using the same according to the present teachings enable the production of a reinforcing bar having sufficient strength in a relatively convenient and inexpensive manner.

DETAILED DESCRIPTION OF A PREFERRED EMBODIMENT

It is noted that the representative exemplary embodiment described below is merely an example, and various design improvements, which may be made by one of ordinary skill in the art without departing from the spirit of the present invention, are also encompassed within the scope of the present teachings.

Figure 1:
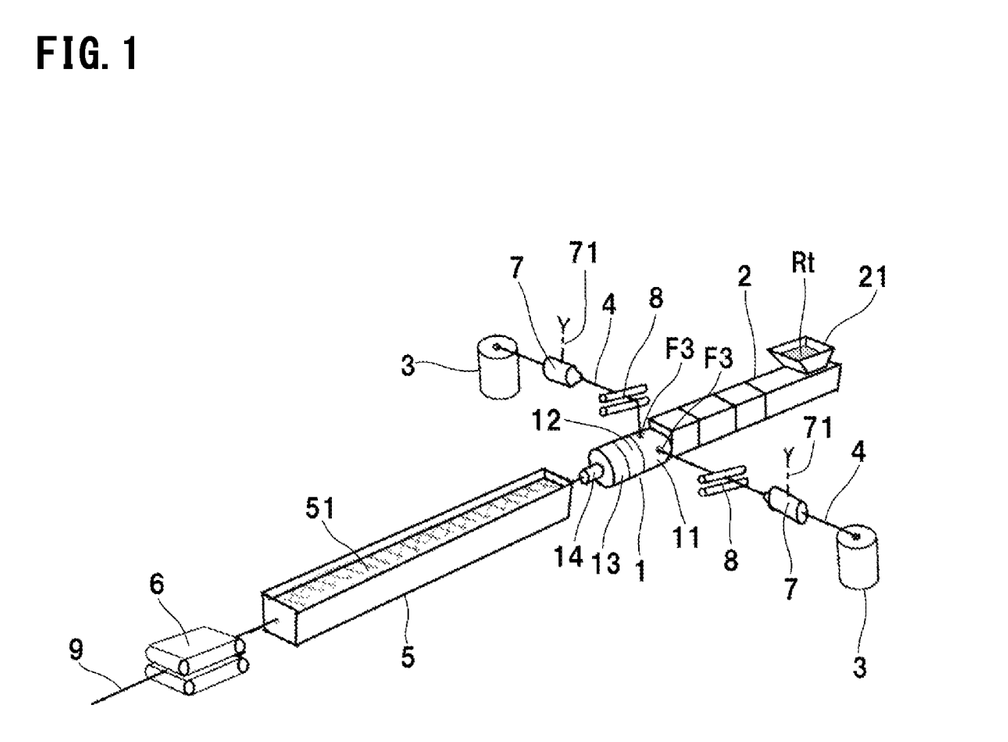
FIG. 1 is a schematic perspective view showing the overall configuration of a reinforcing bar producing device provided with a die for molding a reinforcing bar according to one representative embodiment of the present teachings.

FIG. 1 shows the overall configuration of a reinforcing bar producing device provided with a die 1 for molding a reinforcing bar (hereinafter referred to as "die for molding 1") according to the present teachings. In FIG. 1, an extruder 2 having a well-known structure is provided, and polypropylene (PP) Rt, which serves as the thermoplastic polymer (resin) material, is supplied from a charging hopper, which is mounted on an upper face of one end of extruder 2, into the extruder 2. The PP Rt is heated to a predetermined temperature to bring it into a molten state in the extruder 2, and then the molten PP is supplied into the die for molding 1, which is described below in greater detail, coupled (fastened) to the other end of the extruder 2 by one or more screws, bolts, etc., provided therein.

Figure 2:
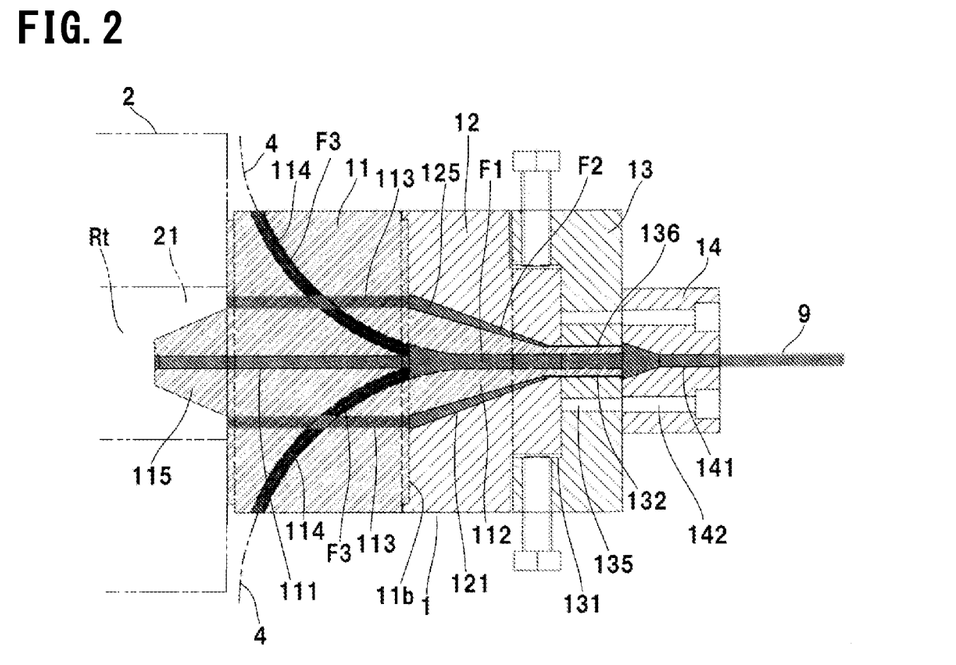
FIG. 2 is an overall vertical cross-sectional view of the die for molding a reinforcing bar according to FIG. 1.
Figure 3:
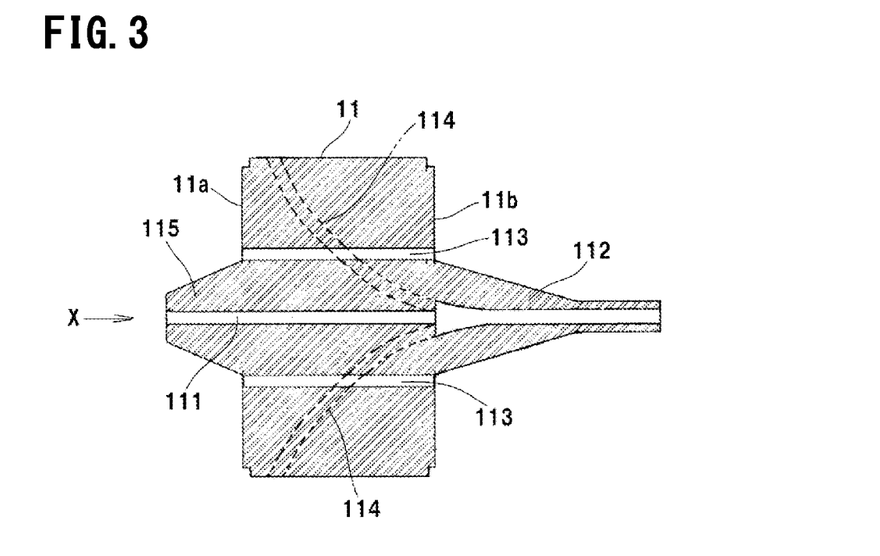
FIG. 3 is a vertical cross-sectional view of a supply die.
Figure 4:
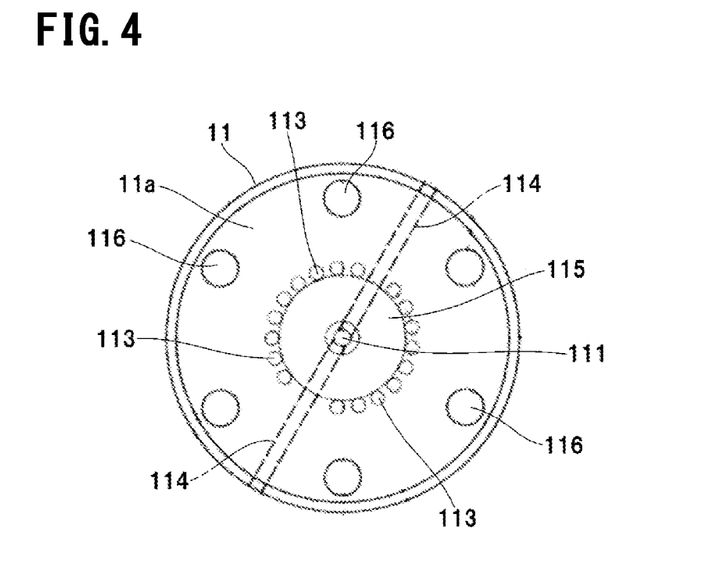
FIG. 4 is a front view of the supply die, as viewed in the direction of an arrow X in FIG. 3.

A mold main body of the die for molding 1 has a generally columnar shape and is constituted by coupling (joining, fastening) four separately-manufactured dies, namely: a supply die 11; a junction die 12; a covering die 13; and a molding die 14. An overall cross-sectional view of the die for molding 1 is shown in FIG. 2. FIG. 3 shows a vertical cross-sectional view of the supply die 11, and FIG. 4 shows a front view of the supply die 11, as viewed in the direction of arrow X in FIG. 3. A first end face 11a of the supply die 11 (left side in FIG. 3) includes a bulging central portion 115 that bulges in a mountain (peak, truncated conical) shape. The first end face 11a is attached to the output end of the extruder 2 so as to cover an outlet opening 21 in the extruder 2. A central through hole 111 is formed in (extends through) the center of the supply die 11 and penetrates (extends) from the first end face 11a to a second (opposite) end face 11b of the supply die 11. The central through hole 111 further penetrates through the center of a guide portion 112 that protrudes from the central portion of the second end face 11b of the supply die 11. The outer diameter of the guide portion 112 reduces (tapers) toward the forward end (right side in FIG. 3) thereof.

At least two first through holes 113 (eighteen first through holes 113 are shown in FIG. 4, although more or fewer first through holes 113 may be provided in the supply die 11, e.g., 2-30 first through holes 113, preferably 10-25 first through holes 113) penetrate through the supply die 11 to the second end face 11b and are arranged at intervals around a circumference (periphery) of the bulging central portion 115. In addition, multiple second through holes 114 (two second through holes 114 are shown in FIG. 4, although more second through holes 114 may be provided in the supply die 11, e.g., 3-8 second through holes 114, preferably 2 or 4 second through holes 114) are formed in the supply die 11 and respectively extend from radially symmetric positions on an outer peripheral surface of the supply die 11 toward the central (interior) portion of the supply die 11, in a curved manner in the vertical cross section. These second through holes 114 reach the central (interior) portion of the second end face 11b, where the second through holes 114 open into and join (fluidly communicate with or fluidly connect to) the central through hole 111.

Figure 5:
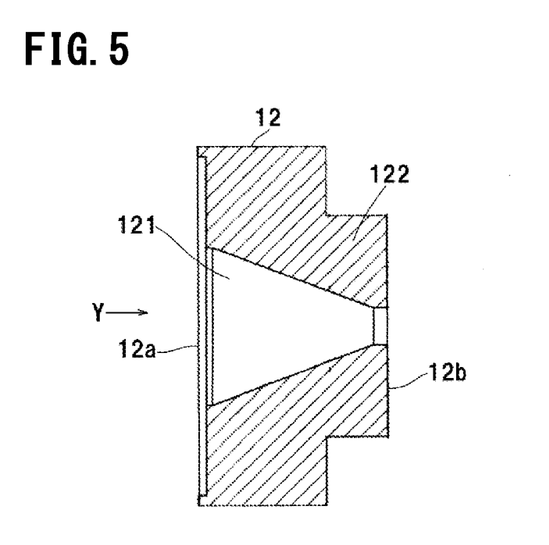
FIG. 5 is a vertical cross-sectional view of a junction die.
Figure 6:
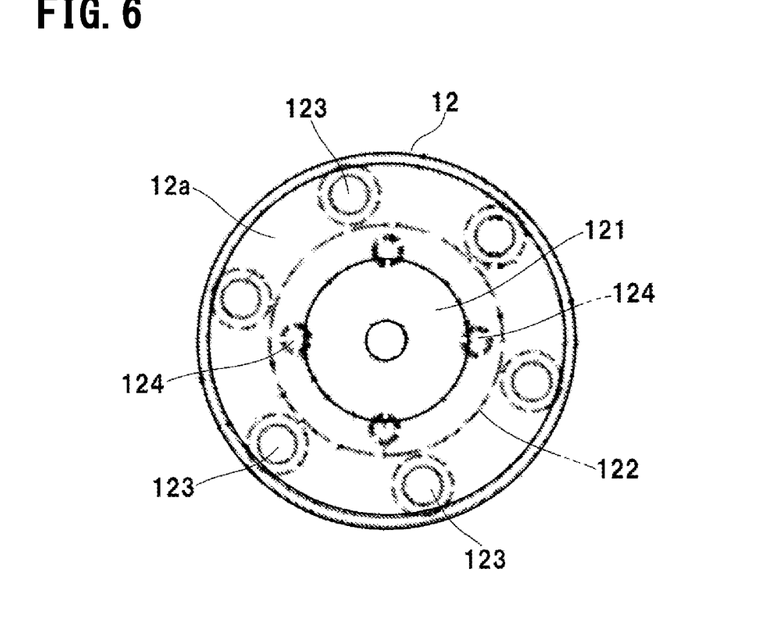
FIG. 6 is a front view of the junction die, as viewed in the direction of an arrow Y in FIG. 5.

FIG. 5 shows a vertical cross-sectional view of the junction die 12, and FIG. 6 shows a front view of FIG. 5 as viewed in the direction of arrow Y shown in FIG. 5. A central through hole 121 is formed in the center of the junction die 12. The central through hole 121 has a larger opening in an inner peripheral portion of a first end face 12a, and the diameter gradually reduces (tapers) toward the second end face 12b while extending through an inner peripheral portion 122, which protrudes in a round shape. That is, the central through hole 121 is cone-shaped and has a shape that substantially matches (follows) the cone-shaped guide portion 112 of the supply die 11, as will be further explained below.

Figure 7:
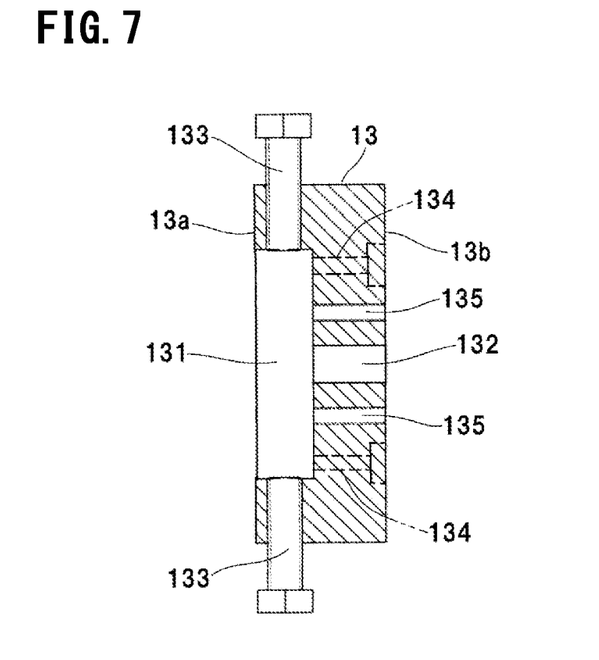
FIG. 7 is a vertical cross-sectional view of a covering die.

FIG. 7 shows a vertical cross-sectional view of the covering die 13. The covering die 13 has a round concave area 131, which is recessed in an inner peripheral portion of a first end face 13a by a predetermined depth. A central through hole 132 penetrates through to a second end face 13b and is formed (opens) in a central portion of the round concave area 131. At least two positioning bolts 133 are inserted from the external side into a peripheral wall of the round concave area 131 at a plurality of equispaced positions in (around) the circumferential direction.

Figure 8:
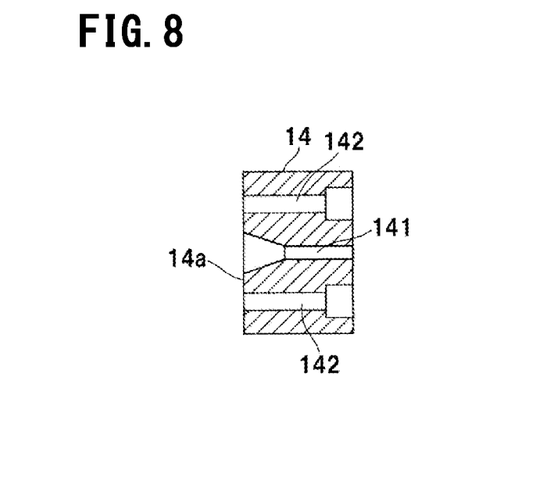
FIG. 8 is a vertical cross-sectional view of a molding die.

FIG. 8 shows a vertical cross-sectional view of the molding die 14. A central through hole 141 is formed in the center of the molding die 14 and is configured to gradually reduce (taper) in diameter from the side of a first end face 14a to match the intended external diameter of a reinforcing bar (rebar) that will be produced as the end product.

The supply die 11, the junction die 12, the covering die 13, and the molding die 14 as described above are coupled (joined, fastened together) as follows. The protruding guide portion 112 of the supply die 11 (FIG. 3) is inserted into the central through hole 121 of the junction die 12 (FIG. 5). Then, bolts are respectively inserted into each of bolt holes 123 (FIG. 6) provided at regular intervals in an outer peripheral portion of the junction die 12 until reaching into each of bolt holes 116 (FIG. 4) provided at regular intervals in an outer peripheral portion of the supply die 11. The bolts are then respectively screwed into each of screw holes (not illustrated) provided in a circumference of the outlet opening 21 of the extruder 2. The molding die 11 and the junction die 12 are thus integrally fixed to the extruder 2.

Then, the protruding inner peripheral portion 122 of the junction die 12 is inserted into the round concave area 131 of the covering die 13. Thereafter, bolts are respectively inserted into each of bolt holes 134 (FIG. 7) provided at regular intervals in an outer peripheral portion thereof, and then screwed into each of screw holes 124 (FIG. 6) provided at regular intervals in the inner peripheral portion 122 of the junction die 12, to thereby couple and fix the covering die 13 to the junction die 12. During this mounting operation, a forward end of the protruding guide portion 112 of the supply die 11 enters the central through hole 132 of the covering die 13.

Bolts are then respectively inserted into each of bolt holes 142 (FIG. 8) provided at regular intervals in an outer peripheral portion of the molding die 14, and then screwed into each of screw holes 135 (FIG. 7) provided at regular intervals in the inner peripheral portion of the covering die 13, to thereby couple and fix the molding die 14 to the covering die 13.

Thus, the die for molding 1 is assembled by coupling the supply die 11, the junction die 12, the covering die 13 and the molding die 14 as described above, and fixing the die for molding 1 to the outlet opening 21 of the extruder 2 (FIG. 2). In this assembled state, the main flow channel F1 is formed by the central through hole 111 of the supply die 11 and the central through hole 141 of the molding die 14, which are fluidly connected with each other. In addition, the first sub flow channel F2, which fluidly connects to the outer peripheral portion in the main flow channel F1 at the border (junction) with the molding die 14, is formed by fluidly connecting: (a) the first through holes 113 of the supply die 11, (b) a gap 125 formed between the outer (conical) periphery of the guide portion 112 of the supply die 11 and the inner (conical) periphery of the central through hole 121 of the junction die 12, and (c) a gap 136 formed between the outer (conical) periphery of the forward end of the guide portion 112 of the supply die 11 and the inner (conical) periphery of the central through hole 132 of the covering die 13.

Here, it is noted that at least the downstream portion of the first sub flow channel F2 is an entire-circumference (conical, single continuous, endless) channel having a ring-shaped (endless) cross section that gradually reduces (tapers) in diameter in the junction die 12 and leads to the interior of the covering die 13, where a ring-shaped cross section having a desired diameter and a desired thickness (radial width) is obtained. In addition, the second through holes 114 extend in a curved manner through the supply die 11 and join (fluidly connect with) the main flow channel F1 in the central portion of the second end face 11b of the supply die 11 on the upstream side of the junction position of the main flow channel F1 and the first sub flow channel F2, to form the second sub flow channels F3.

Referring to FIG. 1, the reinforcing fibers may be incorporated (embedded) into the reinforcing bar 9 as follows. Basalt fiber bundles (twisted fibers) 4, which serve as the reinforcing fiber material, are respectively drawn from a pair of coils 3 and are respectively supplied to the two second sub flow channels F3 (second through holes 114) that open on (at) the outer periphery of the supply die 11. Then, the basalt fiber bundles 4 respectively pass from the second sub flow channels F3 into the main flow channel F1 joined (fluidly coupled) to the second sub flow channels F3. After exiting the die for molding 1, the basalt fibers (when disposed in the reinforcing bar 9) pass through cooling water 51 in a cooling device 5 in the subsequent stage; and then the reinforcing bar 9 (with the basalt fibers disposed therein) is pinched vertically by a pulling belt 6 in the last stage, to pull the reinforcing bar 9 forward out of the die for molding 1. In this example, the thickness of each basalt fiber bundle 4 may be 4,800 TEX.

Figure 9:
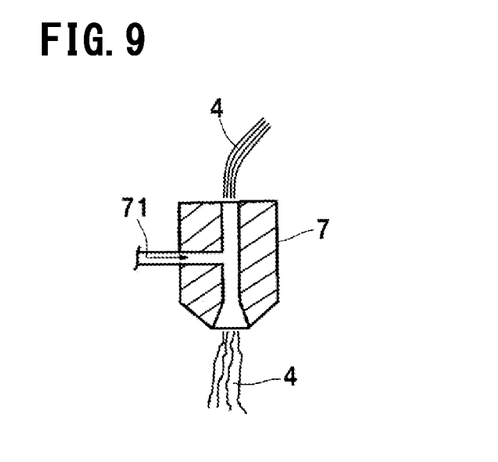
FIG. 9 is a cross-sectional view of a nozzle for loosening, separating, or otherwise introducing spaces (gaps) between, the reinforcing fibers.

It is noted that the basalt fiber bundles 4 drawn from the pair of coils 3 are respectively passed through two nozzles 7 as shown in FIG. 9, and are loosened (separated) by pressurized air 71 supplied thereto in a direction at least substantially perpendicular to the extension direction of basalt fiber bundles 4. That is, each basalt fiber bundle 4 may be provided in the form of a plurality of basalt filaments that are twisted together. By loosening the twisted structure, gaps or spaces are provided between individual basalt filaments in the bundle so that the molten thermoplastic polymer can more easily infiltrate (impregnate) between the respective filaments of each basalt fiber bundle 4. The basalt fiber bundles 4 loosened (separated) by this fiber loosening process are then each supplied to the respective openings of the second sub flow channels F3 (second through holes 114) via respective tension rollers 8. For facilitating understanding, the positions of the openings of the second sub flow channels F3 shown in FIG. 1 are different from the position of those openings in reality.

In this state, while the pulling belt 6 is pulling the basalt fiber bundles 4 in a straight manner without twisting, molten PP Rt is supplied from the extruder 2 into the main flow channel F1 and into the first sub flow channel F2 of the die for molding 1. To the molten PP Rt flowing in the main flow channel F1, the loosened basalt fiber bundles 4 described above are supplied from the second sub flow channels F3 that join in the middle, whereby the PP Rt is caused to infiltrate (impregnate) between the basalt fibers in a thorough and advantageous manner. Then, at a downstream position, molten PP Rt is also supplied from the first sub flow channel F2 to the outer periphery of the basalt fibers impregnated with the molten PP Rt in the central portion, so as to cover the outer circumference of the basalt fibers. After cooling in the cooling device 5 in the subsequent stage, a reinforcing bar 9 (FIG. 1) having sufficient strength is obtained, in which the basalt fibers impregnated with the PP Rt are positioned in a central portion and a predetermined thickness of the PP Rt evenly covers the outer periphery (circumference) of the central portion of the reinforcing bar 9. The diameter of the reinforcing bar 9 may be, e.g., approximately 5 mm, the diameter of the central portion may be, e.g., approximately 4 to 4.5 mm, and the tensile strength of the reinforcing bar 9 thus obtained is preferably about 15 kN.

It is noted that, although the second sub flow channels are formed at two radially symmetric positions in the circumferential direction in the above-described embodiment, supply of the reinforcing fibers in small portions to the main flow channel permits the thermoplastic polymer (resin) material to advantageously infiltrate (impregnate) between the reinforcing fibers. Therefore, it is preferred to form second sub flow channels at two to four positions in the circumferential direction, to minimize complexity of the die.

In addition or in the alternative to PP, the thermoplastic polymer (resin) material of the above-described embodiment may be or include, e.g., polyethylene, nylon, polyester, or the like. In addition or in the alternative to basalt fibers, the reinforcing fibers may be or include another type of inorganic fiber, such as, e.g., glass fiber or carbon fiber, and/or may be an organic fiber such as aramid fiber or acrylic fiber.

According to the embodiment as described above, the overall size of a device for making a fiber reinforced polymer reinforcing bar can be reduced by eliminating a storage tank for molten polymer, thereby leading to a reduction in production costs as compared to conventional dipping (immersion) methods, whereby production of a reinforcing bar having sufficient strength in a relatively convenient and inexpensive manner is enabled. Note that the specific structure of the die for molding is not necessarily limited to that shown in FIG. 2.

Additional teachings that may be advantageously utilized together with the teachings of the present application, such as compositions, sizes, arrangements, etc. of suitable thermoplastic polymers, reinforcing fibers, etc., are disclosed in U.S. patent application Ser. No. 17/464,996, the contents of which are fully incorporated herein by reference.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved dies for molding a reinforcing bar and methods of using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A die for molding a solid reinforcing bar, comprising:
a main body;
a main flow channel formed as a single central through hole that extends longitudinally through a central portion of the main body and is configured to fluidly communicate a molten thermoplastic polymer material output from an extruder;
at least one first sub flow channel formed in an outer peripheral portion of the main body and configured to fluidly communicate thermoplastic resin material from the extruder, the first sub flow channel being fluidly connected to an outer peripheral portion of the main flow channel at a junction position within the main body; and
a plurality of second sub flow channels defined in the main body starting from respective positions that are radially outward of the single central through hole and curving radially inward to respectively guide reinforcing fibers into the single central through hole of the main flow channel upstream of the junction position of the single central through hole of the main flow channel and the at least one first sub flow channel;
wherein the single central through hole is hollow along an entire longitudinal length of the main flow channel from a first longitudinal end of the main body to a second longitudinal end of the main body that is opposite of the first longitudinal end such that the main flow channel is shaped to output the solid reinforcing bar.

2. The die according to claim 1, wherein:
the main body is composed of a plurality of columnar dies that are coupled from an upstream side to a downstream side; and
the main flow channel, the at least one first sub flow channel, and the at least one plurality of second sub flow channels are formed within one or more of the plurality of columnar dies.

3. The die according to claim 2, wherein:
at least a downstream portion of the at least one first sub flow channel is configured as an entire-circumference channel having a ring-shaped cross section, and
a diameter and a thickness of the entire-circumference channel reduce toward the downstream side.

4. The die according to claim 3, wherein the second sub flow channels are respectively formed at a plurality of positions around a circumferential direction of the main body.

5. The die according to claim 4, wherein:
the plurality of columnar dies comprises a supply die fastened to a junction die,
the at least one first sub flow channel is a plurality of first through holes discretely extending through the supply die, and
the first through holes are fluidly connected to the entire-circumference channel defined in the junction die.

6. The die according to claim 4, wherein the plurality of second sub flow channels is fluidly connected to the main flow channel within the supply die.

7. The die according to claim 6, wherein the entire-circumference channel fluidly connects with the main flow channel in the junction die.

8. The die according to claim 1, wherein:
at least a downstream portion of the at least one first sub flow channel is configured as a conical channel having a ring-shaped cross section, and
a diameter and a thickness of the conical channel tapers toward a downstream side of the main body.

9. The die according to claim 1, wherein the second sub flow channels are respectively formed at a plurality of positions around a circumferential direction of the main body.

10. The die according to claim 2, wherein:
the plurality of columnar dies comprises a supply die fastened to a junction die,
the at least one first sub flow channel is a plurality of first through holes discretely extending through the supply die, and
the first through holes are fluidly connected to an entire-circumference channel defined in the junction die.

11. The die according to claim 10, wherein the plurality of second sub flow channels is fluidly connected to the main flow channel within the supply die.

12. The die according to claim 11, wherein the entire-circumference channel fluidly connects with the main flow channel in the junction die.

13. The die according to claim 12, further comprising:
a plurality of nozzles upstream of the respective second sub flow channels,
wherein the nozzles are configured to each loosen a plurality of reinforcing fibers prior to supplying the reinforcing fibers to the respective second sub flow channels.

14. The die according to claim 1, further comprising:
a plurality of nozzles upstream of the respective second sub flow channels,
wherein the nozzles are configured to each loosen a plurality of reinforcing fibers prior to supplying the reinforcing fibers to the respective second sub flow channels.

15. The die according to claim 1, wherein the single central through hole extends straight from the first longitudinal end of the main body to the second longitudinal end of the main body.

16. The die according to claim 15, wherein:
the main body comprises a supply die fastened to a junction die,
the at least one first sub flow channel comprises a plurality of first through holes defined within the supply die,
the main flow channel and the plurality of second sub flow channels are also discretely defined within the supply die,
the first through holes each extend in parallel to the main flow channel within the supply die, and
the plurality of second sub flow channels is fluidly connected to the main flow channel within the supply die.

17. The die according to claim 16, wherein:
the first through holes fluidly connect to a conical channel defined within the junction die, the conical channel having a ring-shaped cross section that surrounds the main flow channel,
a diameter and a thickness of the conical channel reduce toward the downstream side, and
the conical channel fluidly connects with the main flow channel downstream of the junction die.

18. A method for producing a solid reinforcing bar, comprising:
supplying a molten thermoplastic polymer material into the main flow channel and the at least one first sub flow channel of the die according to claim 1,
supplying a plurality of reinforcing fibers into the plurality of second sub flow channels of the die, and
forming the solid reinforcing bar inside the main body such that the reinforcing fibers are impregnated with the thermoplastic polymer material in a central portion of the reinforcing bar and an outer layer of the thermoplastic polymer material surrounds the central portion of the solid reinforcing bar.

19. The method according to claim 18, wherein:
the thermoplastic polymer material comprises one or more of polypropylene, nylon and/or polyester, and
the reinforcing fibers comprise one or more of basalt fibers, glass fibers, carbon fibers, aramid fibers and/or acrylic fibers.

20. The method according to claim 19, further comprising:
prior to supplying the reinforcing fibers into the plurality of second sub flow channels, loosening the reinforcing fibers by passing the reinforcing fibers through a plurality of nozzles while supplying pressurized air into the nozzles.

* * * * *

UNITED STATES PATENT AND TRADEMARK OFFICE
CERTIFICATE OF CORRECTION

| | |
|---|---|
| PATENT NO. | : 12,011,862 B2 |
| APPLICATION NO. | : 17/530519 |
| DATED | : June 18, 2024 |
| INVENTOR(S) | : Hiroshige Nakagawa et al. |

It is certified that error appears in the above-identified patent and that said Letters Patent is hereby corrected as shown below:

In the Claims

In Claim 2, at Column 8, Line 41, delete "at least one"

Signed and Sealed this
Sixth Day of August, 2024

Katherine Kelly Vidal
*Director of the United States Patent and Trademark Office*